Patented Aug. 11, 1942

2,292,461

UNITED STATES PATENT OFFICE 2,292,461

PROCESS FOR THE INTRODUCTION OF ARYL GROUPS INTO α-β-UNSATURATED CARBONYL COMPOUNDS AND THEIR DERIVATIVES

Hans Meerwein, Maribor-on-the-Lahn, Germany, assignor, by mesne assignments, to Sherka Chemical Company, Inc., Bloomfield, N. J., a corporation of New York No Drawing. Application September 16, 1936, Serial No. 101,081. Renewed July 7, 1939. In Germany September 17, 1935

8 Claims. (Cl. 260—344)

This invention relates to a process for the introduction of aryl groups into α-β-unsaturated carbonyl compounds and their derivatives.

In accordance with the present invention α-β-unsaturated carbonyl compounds, such as α-β-unsaturated aldehydes, ketones and carboxylic acids and also their derivatives in so far as they contain a hydrogen atom on the carbon atom adjacent the carbonyl group, are reacted with aromatic diazo compounds in such a manner that in the course of the reaction the nitrogen is split off while the hydrogen atom adjacent the carbonyl group is replaced by the aryl group which is the basis of the diazo compound. It is possible in this manner to introduce an aromatic residue into the said unsaturated compounds.

According to the invention there are obtained, for example, from benzal acetone with diazo compounds α-acetyl stilbenes according to the following equation:

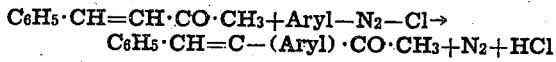

$C_6H_5 \cdot CH=CH \cdot CO \cdot CH_3 + Aryl—N_2—Cl \rightarrow$
$C_6H_5 \cdot CH=C—(Aryl) \cdot CO \cdot CH_3 + N_2 + HCl$ and from cumarin 3-aryl-cumarins according to the following equation:

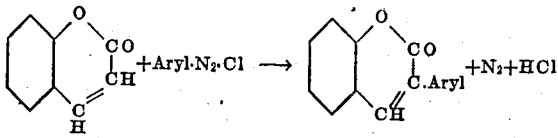

By the action of diazo compounds on α-β-unsaturated carboxylic acids in individual cases in the course of the arylation the carboxyl group is more or less completely split off as carbon dioxide. Thus there are obtained from cinnamic acid, instead of the α-aryl cinnamic acids, stilbenes according to the following equation:

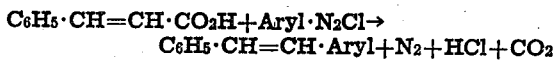

$C_6H_5 \cdot CH=CH \cdot CO_2H + Aryl \cdot N_2Cl \rightarrow$
$C_6H_5 \cdot CH=CH \cdot Aryl + N_2 + HCl + CO_2$ In the application of aryldiazonium haloids there are produced in individual cases, as, for example, by the action of p-chlorobenzene diazonium chloride on benzal acetone, instead of the arylated α-β-unsaturated carbonyl compounds their hydrogen halide addition products from which only by subsequent treatment with agents splitting off hydrogen halide, for example, by heating with sodium acetate in glacial acetic acid, are the arylated unsaturated carbonyl compounds obtained.

Instead of the diazo compounds such compounds can also be employed as are easily converted into diazo compounds, for example, acylnitrosamines of the formula Aryl-N(COR)NO.

The reaction takes place according to the nature of the components employed between 10 and 40° C. with practically quantitative splitting off of the nitrogen. An addition of copper or copper salts favours the course of the reaction to an extraordinary degree.

The reaction can be carried out in strong acetic acid, aqueous alcoholic or aqueous acetone solution with the addition of alkali acetates or alkali salts of other weak acids, for example, the salts of the carboxylic acids to be arylated. There can also find application, however, solvents not miscible with water such as methylene chloride, acetylene tetrachloride and others. The presence of negative substituents in the diazo compound favours the course of the reaction.

In German Patent No. 508,395 a process is described for the manufacture of nuclear substituted quinones, wherein aromatic diazo compounds are allowed to react on quinones (compare also Kvalnes, Journal of the American Chemical Society, 56, 2478, (1934); Wieland, Ann. 415, 157 (1934)). The quinones are distinguished, however, as is known, by numerous addition and substitution reactions to such a far-reaching extent from the α-β-unsaturated carbonyl compounds without quinone character that it could not be foreseen on the basis of the behaviour of the quinones with respect to aromatic diazo compounds that also α-β-unsaturated carbonyl compounds without quinone character would react with diazo compounds with the introduction of aryl groups.

The following examples illustrate the invention:

Example 1

A solution of p-nitrobenzene diazonium chloride, prepared from 6.9 grams of p-nitraniline (1/20 mol), 20 grams of 25% hydrochloric acid, 20 grams of ice and 3.6 grams of sodium nitrite in 7.2 ccs. of water is introduced without further cooling all at once into a solution of 6.7 grams of cumarin (1/20 mol), in 40 ccs. of acetone in which 11 grams of crystallised sodium acetate are suspended. To the mixture is added with brisk stirring a solution of 0.5 gram of copper sulphate in 10 ccs. of water. The nitrogen evolution takes place immediately and is complete after 1 hour; the temperature of the reaction mixture is maintained at about 19° C. In time the mixture becomes colored dark brown and at the same time there separates a crystalline precipitate. After completion of the reaction the acetone is driven off with steam, the brown colored crystalline mass filtered with suction and for removal of unattacked cumarin ground with 30–40 ccs. of acetone. There is obtained practically pure 3-p-nitrophenyl-cumarin in good yield. By recrystallisation from pyridine or anisol it is obtained in the form of yellow needles of M. P. 264° C.

In a similar manner by the interaction of the diazo compounds from p-chloraniline, β-naphthylamine, p-amino benzoic acid and sulphanilic acid are obtained the 3-p-chlorophenyl-cumarin, 3-β-naphthyl-cumarin, 3 - phenyl - cumarin-4'-carboxylic acid and 3-phenyl-cumarin-4'-sulphonic acid.

*Example 2*

A solution of p-chlorobenzene diazonium chloride (¼ mol) prepared from 32 grams of p-chloraniline, 100 grams of 25% hydrochloric acid, 100 grams of ice and 18 grams of sodium nitrite in 36 ccs. of water, is introduced into a solution of 37 grams of cinnamic acid (¼ mol) in 200 ccs. of acetone in which 55 grams of crystallised sodium acetate are suspended. The temperature of the mixture amounts to 20° C. There is added a solution of 15 grams of copper sulphate in 50 ccs. of water, whereupon after about 10 minutes a brisk evolution of nitrogen and carbon dioxide sets in. By external cooling the temperature is maintained at 24–25° C. After 3 hours the reaction is complete.

Thereupon the acetone is blown off with steam, the brown colored crystalline residue filtered with suction and for destruction of a complex Cu-salt which disturbs further working up stirred with a mixture of 10 ccs. of 15% hydrochloric acid and 700 ccs. of ether for 1½ hours. The whole is filtered from small quantities of a yellow copper salt, the ethereal solution separated off and shaken twice for removal of unattacked cinnamic acid and small quantities of chlorophenyl cinnamic acid with a total of 200 ccs. of normal ammonia solution. Any p-chloro stilbene crystallizing out is brought into solution by the addition of ether. From the ethereal solution by evaporation p-chloro stilbene is obtained which after recrystallisation from glacial acetic acid or benzine is produced in the form of colorless leaflets of melting point 127.5–128.5° C. With crotonic acid there is obtained chiefly α-(p-chlorophenyl)-crotonic acid, but also carbon dioxide splitting and formation of p-chloro-propenyl benzene can be observed.

*Example 3*

A solution of p-chlorobenzene diazonium chloride (¼ mol) prepared as in Example 2 is added to a solution of 36.5 grams of benzal acetone (¼ mol) in 200 ccs. of acetone in which 110 grams of crystallised sodium acetate are suspended. Thereto is added a solution of 15 grams of copper sulphate in 50 ccs. of water. The nitrogen evolution commences at 25° C. and becomes brisk at 30–33° C. After one hour the reaction is complete. The acetone is distilled off, the reaction product taken up in ether, the ethereal solution washed consecutively with water, ammonia and dilute acetic acid and the ether distilled off. The residue is for splitting off of the added hydrochloric acid heated to boiling for half an hour with a solution of 45 grams of anhydrous sodium acetate in 180 ccs. of glacial acetic acid and the reaction mixture poured on ice. The semi-solid mass separating out is ground with the smallest possible quantity of glacial acetic acid and the α-acetyl-p-chloro stilbene filtered with suction. By recrystallisation from benzine it is obtained in the form of yellowish lustrous leaflets of M. P. 105–106° C. It dissolves in concentrated sulphuric acid with an intense yellow color which on gentle warming becomes emerald green.

*Example 4*

A solution of p-chlorobenzene diazonium chloride (¼ mol), prepared from 32 grams of p-chloraniline, 100 grams of 25% hydrochloric acid and 18 grams of sodium nitrite in 36 ccs. of water, is added to a solution of 33 grams of cinnamic aldehyde (¼ mol) in 200 grams of acetone in which 55 grams of crystalline sodium acetate are suspended. The temperature of the mixture amounts to 17° C. Then there is further added a solution of 15 grams of copper sulphate in 50 ccs. of water whereupon nitrogen evolution sets in immediately. By cooling, the temperature of the mixture is maintained at about 25° C., the whole being briskly stirred. After 2 hours the nitrogen evolution is complete. From the brown colored reaction mixture the acetone is driven off with steam. The residue is taken up in ether, the ether distilled off and the remaining oil, for removal of any unchanged cinnamic aldehyde present, is stirred for one hour at room temperature with a solution of 120 grams of crystalline sodium sulphite and 35 grams of sodium carbonate in 750 ccs. of water. The oil permeated by crystals is ground with a little ether and the separated crystals filtered with suction. From the mother liquor there are obtained by distillation in high vacuum further quantities of the reaction product in oily form, which by treatment with petrol ether give crystalline α-p-chlorophenyl cinnamic aldehyde. The combined portions are recrystallised from benzine or 70% acetic acid and are then produced in colorless leaflets of melting point 85–86° C. In concentrated sulphuric acid only aldehyde is soluble, though difficultly, with intensive green blue color.

Of course, many changes and variations in the reaction conditions etc. may be made by those skilled in the art in accordance with the principles set forth herein and in the claims annexed hereto.

What I claim is:

1. Process for the production of aryl derivatives of unsaturated compounds, which comprises reacting an α-β-unsaturated carbonyl compound of non-quinone character and containing a hydrogen atom on the carbon atom adjacent to the carbonyl group with a member of the group consisting of aromatic diazonium salts and compounds yielding such salts, in weakly acid solution and at such temperatures that the diazo group is split off as nitrogen.

2. Compounds of the formula

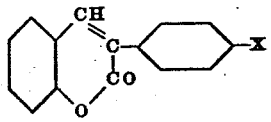

wherein X is a salt-forming group of the class consisting of carboxylic and sulfonic groups.

3. The compound of the formula

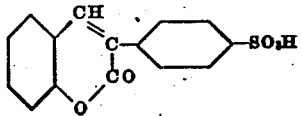

4. Process as claimed in claim 1, wherein cumarins are employed as starting material.

5. Process as claimed in claim 1, wherein the reaction is carried out in the presence of a copper-containing catalyst.

6. Process as claimed in claim 1, wherein the reaction products obtained by interaction with aryldiazonium haloids are treated with agents splitting off hydrogen halide.

7. Process as claimed in claim 1, wherein the starting carbonyl compound has an aliphatic double bond.

8. Process as claimed in claim 1, wherein instead of the aromatic diazonium compounds, acylnitrosamines are employed.

HANS MEERWEIN.